Patented Feb. 4, 1947

2,415,261

UNITED STATES PATENT OFFICE 2,415,261

PRODUCTION OF NITRILES

Arthur O. Rogers, Lewiston, N. Y., assignor to E. I. du Pont de Nemours & Company, Wilmington, Del., a corporation of Delaware No Drawing. Application December 15, 1944, Serial No. 568,393

11 Claims. (Cl. 260—464)

This invention relates to the production of saturated alpha, omega-dinitriles. More particularly it relates to a new and improved process for the production of saturated alpha, omega-dinitriles by reacting a saturated alpha, omega-dihalide with a metal cyanide.

It has long been known that saturated alpha, omega-dihalides can be reacted with a metal cyanide to produce the corresponding dinitrile. This reaction is most usually performed in a liquid solvent medium, for example, an aliphatic alcohol or a mixture of an aliphatic alcohol and water. The reaction between the dihalide and metal cyanide is, however, subject to the simultaneous production of relatively large quantities of undesired by-products. It has now been found that the production of undesirable by-products can be very considerably reduced, and the yield of said dinitriles correspondingly increased if the above-said reaction is carried out in the presence of certain liquid reaction media as hereinafter set forth. This increase in yield is found to take place in reactions between metal cyanides and saturated dihalides, whereas in the case of unsaturated dihalides such an increased yield does not take place.

It is an object of this invention to provide a new and improved process for the production of saturated alpha, omega-dinitriles by a reaction between a saturated alpha, omega-dihalide and a metal cyanide.

It is another object of this invention to increase the yield of alpha, omega-dinitriles obtained by reacting a saturated alpha, omega-dinitrile with a metal cyanide.

It is another object of this invention to provide a process for the production of alpha, omega-dinitriles by reacting a saturated alpha, omega-dinitrile with a metal cyanide in which the production of undesirable by-products is minimized.

Other objects of the invention will appear hereinafter.

The above objects may be accomplished, in general, by carrying out the reaction between a saturated alpha, omega-dihalide and a metal cyanide in a liquid, reaction medium comprising an ether-alcohol which will dissolve an appreciable proportion (at least 1%, by weight) of the dihalide and metal cyanide.

By the term "ether-alcohol" is meant a compound containing both an ether linkage and an alcoholic hydroxyl group. By the use of an ether-alcohol as a solvent reaction medium saturated alpha, omega-dihalides have been found to react smoothly and rapidly with metal cyanides, and produce high yields with a minimum quantity of undesirable by-products. The preparation of dinitriles from saturated alpha, omega-dihalides is usually accompanied by side-reactions leading to the production of tarry products which detract seriously from the yield of the desired compounds.

In addition to suppressing the formation of such by-products, the ether-alcohols promote rapid reaction because of their high boiling points as compared to the low molecular-weight alcohols ordinarily used. A similar effect is not obtainable by the use of simple long-chain alcohols such as amyl, hexyl or octyl alcohol, because such compounds have insufficient solvent power for metal cyanides. Moreover, polyhydric alcohols, such as ethylene glycol, although they possess high boiling points and good solvent power, are found to promote the formation of by-products and hence to lead to poor yields of the desired nitriles.

Preferably, the saturated dihalide is reacted with the metal cyanide in the presence of the ether-alcohol at an elevated temperature. The reaction may be conveniently effected by mixing the metal cyanide with the ether-alcohol, heating to the boiling point of the ether-alcohol, and adding the dihalide while stirring to maintain any undissolved portion of the metal cyanide in suspension.

Under such conditions, the reaction proceeds smoothly and produces a high yield of a nitrile through replacement of the halogen of the dihalide by the cyanide radical. If desired, the dihalide may be added before heat is applied, and the reaction initiated by raising the temperature. However, I prefer to add at least a portion of the halogen compound gradually since the exothermic character of the reaction makes it otherwise difficult to control. In certain cases, it may be desirable to carry out the reaction at temperatures below or above the normal boiling point of the solvent. In the latter case, of course, equipment capable of withstanding pressures greater than atmospheric is required. In addition to the ether-alcohol, other solvents such as water, methyl alcohol or ethyl alcohol or non-solvent diluents such as hydrocarbons may be included in the mixture; in general however, this is not necessary or desirable. A catalyst such as an iodide may be used if desired to accelerate the reaction of less active dihalides.

The process of this invention is applicable, in general, to saturated alpha, omega-dihalides, for example, ethylene dichloride, ethylene dibromide, 1,4-dichlorobutane, 1,4-dibromobutane, 1,5-dichloropentane, and 1,6-dichlorohexane. It is possible by suitable choice of conditions to effect a partial replacement of halogen of the dihalide. For example, the reaction of NaCN with 1,4-dichlorobutane will yield mainly adiponitrile under one set of conditions, or mainly delta-chlorovaleronitrile under other conditions.

Any metal cyanide which is soluble to the extent of at least 1% by weight in the ether-alcohol reaction medium may be used in carrying out the precess of this invention. On a basis of efficiency, cheapness and availability, sodium cyanide, potassium cyanide, cuprous cyanide, calcium cyanide and zinc cyanide are preferred.

As examples of ether-alcohols which may be used in the process of this invention, the following may be named; the mono-alkyl ethers of ethylene glycol, for example, mono-methyl ether of ethylene glycol, mono-ethyl ether of ethylene glycol, mono-butyl ether of ethylene glycol; the mono aryl ethers of ethylene glycol; the mono-alkyl ethers of diethylene glycol; the dialkyl ethers of glycerol; tetrahydrofurfuryl alcohol, and the mono-alkyl ethers of tetramethylene glycol.

The following examples are given to illustrate certain preferred processes for carrying out the invention, it being understood, of course, that the scope of the invention is not to be limited by the details given in the examples.

Example I

A suspension of 206 g. (4.04 moles) technical grade NaCN in 400 cc. of monomethyl ether of ethylene glycol was heated under reflux with stirring. 1,4-dichlorobutane (245 g.; 2.0 moles) was added gradually over a period of 20 minutes. The mixture was allowed to boil under its own heat of reaction for 25 minutes and was then boiled with externally applied heat for an additional 35 minutes (total reaction time 1 hour 20 minutes). The mixture was filtered, and the following products recovered by fractionation under reduced pressure: adiponitrile 194.5 g. (90.0% of theoretical); delta-chloro valeronitrile 12.0 g. (5.1% of theoretical). The latter product was suitable for conversion to adiponitrile by further treatment with NaCN.

In a similar reaction, using aqueous ethyl alcohol containing 75% of the alcohol as solvent, an 80.4% yield of adiponitrile and 9.4% of delta-chlorovoleronitrile were obtained in 14 hours reaction time.

Example II

A suspension of 156 g. (3.0 moles) technical NaCN in 150 cc. of tetrahydrofurfuryl alcohol was heated to 104° C. with stirring. Ethylene dichloride (3.0 moles) was added gradually (½ hour) and the mixture heated with stirring at 104–109° C. for a total of 2 hours. Salt was separated by filtration, and the product distilled under reduced pressure. The yield of succinonitrile was 105 g., 87.5% on the basis of NaCN charged, or 91.5% allowing for unreacted NaCN recovered.

Example III

A mixture of 3 moles NaCN, 1 mole ethylene dichloride and 150 cc. monomethyl ether of ethylene glycol was heated under reflux with stirring until the temperature reached 95° C. Two moles of ethylene dichloride was added gradually, at such a rate that the boiling mixture maintained a temperature of 94–102° C.; the total reaction time was seven hours. The product recovered as in Example II, contained 98 g. of succinonitrile, a yield of 83% based on NaCN charged, or 93% based on NaCN consumed.

Example IV

A series of runs was carried out under the following conditions. An initial charge of 11.1 moles 1,4-dichlorobutane, 5 moles NaCN and 887 g. monomethyl ether of ethylene glycol was heated under reflux with stirring for 15–30 minutes after the first exothermic reaction had subsided. The resulting salt was filtered off, and the solvent, together with unreacted dichlorobutane, distilled under reduced pressure. This distillate was returned to the reaction flask and dichlorobutane and NaCN added in such proportion as to maintain a substantial excess of dichlorobutane. The above procedure was then repeated. At the end of the series, the following products were recovered by vacuum fractionation: 1,4-dichlorobutane 5.1 moles; delta-chlorovaleronitrile 41.1 moles; adiponitrile 9.08 moles. Based on 1,4-dichlorobutane consumed, this represents a yield of 81% of the theoretical delta-chlorovaleronitrile, with a 17.8% yield of adiponitrile as by-product. The total yield of organic nitriles based on NaCN was 95.6%.

This invention may be used in the preparation of such dinitriles as are obtainable from the reaction of saturated alpha, omega-dihalides with metal cyanides. Such nitriles in turn may serve as intermediates in the preparation of a wide variety of compounds including dicarboxylic acids, diamides, diesters and diamines.

Furthermore, this type of reaction provides one of the most generally applicable methods for increasing the length of aliphatic chains in organic compounds. The invention is especially valuable for the following reasons:

1. Saturated alpha, omega-dinitriles and the acids the amines derivable from them are of great value in the manufacture of synthetic linear resins of the polyamide and polyester types, as well as in the preparation of various solvents and plasticizers.
2. Suitable dichlorides, e. g. ethylene dichloride and 1,4-dichlorobutane are among the cheapest and most readily available intermediates for alpha-omega-bifunctional compounds.
3. Alkali metal cyanides are cheap and widely available.
4. Other methods for effecting the reaction of such dichlorides with alkali metal cyanides are unsatisfactory in respect to yield and ease of operation.

As will be evident from the foregoing discussion, the advantages of this invention lie in the improved yields and reaction rates obtainable by its use in the preparation of dinitriles. In certain cases, as in the preparation of succinonitrile from ethylene dichloride it provides a means for obtaining excellent yields in reactions for which no practical method of operation was previously known.

Since it is obvious that many changes and modifications can be made in the above-described details without departing from the nature and spirit of the invention, it is to be understood that the invention is not to be limited to said details except as set forth in the appended claims.

I claim:

1. A process for the production of saturated alpha, omega-dinitriles which comprises reacting a saturated alpha, omega-dihalide with a metal cyanide taken from the group consisting of sodium cyanide, potassium cyanide, cuprous cyanide, calcium cyanide, and zinc cyanide in a liquid reaction medium comprising an ether-alcohol taken from the group consisting of the mono-alkyl ethers of ethylene glycol, the mono-aryl ethers of ethylene glycol, the mono-alkyl ethers of diethylene glycol, the mono-alkyl ethers of tetramethylene glycol, the dialkyl ethers of glycerol, and tetrahydrofurfuryl alcohol which will dissolve an appreciable proportion of said reactants.

2. A process for the production of saturated alpha, omega-dinitriles which comprises reacting a saturated alpha, omega-dihalide with an alkali metal cyanide in a liquid reaction medium comprising an ether-alcohol taken from the group consisting of the mono-alkyl ethers of ethylene glycol, the mono-aryl ethers of ethylene glycol, the mono-alkyl ethers of diethylene glycol, the mono-alkyl ethers of tetramethylene glycol, the dialkyl ethers of glycerol, and tetrahydrofurfuryl alcohol which will dissolve an appreciable proportion of said reactants.

3. A process for the production of saturated alpha, omega-dinitriles which comprises reacting a saturated alpha, omega-dihalide with a metal cyanide taken from the group consisting of sodium cyanide, potassium cyanide, cuprous cyanide, calcium cyanide, and zinc cyanide in a liquid reaction medium comprising a mono-alkyl ether of ethylene glycol.

4. A process for the production of saturated alpha, omega-dinitriles which comprises reacting a saturated alpha, omega-dihalide with a metal cyanide taken from the group consisting of sodium cyanide, potassium cyanide, cuprous cyanide, calcium cyanide, and zinc cyanide in a liquid reaction medium comprising tetrahydrofurfuryl alcohol.

5. A process for the production of saturated alpha, omega-dinitriles which comprises reacting a saturated alpha, omega-dihalide with an alkali metal cyanide in a liquid reaction medium comprising a mono-alkyl ether of ethylene glycol.

6. A process for the production of saturated alpha, omega-dinitriles which comprises reacting a saturated alpha, omega-dihalide with an alkali metal cyanide in a liquid reaction medium comprising tetrahydrofurfuryl alcohol.

7. A process for the production of adiponitrile which comprises reacting 1,4-dichlorobutane with sodium cyanide in a liquid reaction medium comprising an ether-alcohol taken from the group consisting of the mono-alkyl ethers of ethylene glycol, the mono-aryl ethers of ethylene glycol, the mono-alkyl ethers of diethylene glycol, the mono-alkyl ethers of tetramethylene glycol, the dialkyl ethers of glycerol, and tetrahydrofurfuryl alcohol which will dissolve an appreciable proportion of said reactants.

8. A process for the production of adiponitrile which comprises reacting 1,4-dichlorobutane with sodium cyanide in a liquid reaction medium comprising a mono-alkyl ether of ethylene glycol.

9. A process for the production of succinonitrile which comprises reacting ethylene dichloride with sodium cyanide in a liquid reaction medium comprising an ether-alcohol taken from the group consisting of the mono-alkyl ethers of ethylene glycol, the mono-aryl ethers of ethylene glycol, the mono-alkyl ethers of diethylene glycol, the mono-alkyl ethers of tetramethylene glycol, the dialkyl ethers of glycerol, and tetrahydrofurfuryl alcohol which will dissolve an appreciable proportion of said reactants.

10. A process for the production of succinonitrile which comprises reacting ethylene dichloride with sodium cyanide in a liquid reaction medium comprising a mono-alkyl ether of ethylene glycol.

11. A process for the production of pimelonitrile which comprises reacting 1,5-dichloropentane with sodium cyanide in a liquid reaction medium comprising an ether-alcohol taken from the group consisting of the mono-alkyl ethers of ethylene glycol, the mono-aryl ethers of ethylene glycol, the mono-alkyl ethers of diethylene glycol, the mono-alkyl ethers of tetramethylene glycol, the dialkyl ethers of glycerol, and tetrahydrofurfuryl alcohol which will dissolve an appreciable proportion of said reactants.

ARTHUR O. ROGERS.

REFERENCES CITED

The following references are of record in the file of this patent:

UNITED STATES PATENTS

| Number | Name | Date |
|---|---|---|
| 2,211,240 | Macallum | Aug. 13, 1940 |
| 2,298,231 | Rainsford et al. | Oct. 6, 1942 |

FOREIGN PATENTS

| Number | Country | Date |
|---|---|---|
| 333,989 | British | Aug. 28, 1930 |